(12) United States Patent
Tarrant et al.

(10) Patent No.: US 8,277,546 B2
(45) Date of Patent: Oct. 2, 2012

(54) HYDROCARBON ADSORPTION TRAP WITH SNAP CLOSURE FEATURES

(75) Inventors: Joshua Tarrant, Mattawan, MI (US); Alexander Braithwaite, Climax, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 392 days.

(21) Appl. No.: 12/610,712

(22) Filed: Nov. 2, 2009

(65) Prior Publication Data

US 2011/0100223 A1 May 5, 2011

(51) Int. Cl.
*B01D 63/04* (2006.01)
*F02M 33/02* (2006.01)
(52) U.S. Cl. ............................. 96/147; 96/151; 55/493
(58) Field of Classification Search ............ 96/147, 96/151, 154; 55/385.3, 490, 493, 501, DIG. 31
See application file for complete search history.

(56) References Cited

U.S. PATENT DOCUMENTS

| | | | | |
|---|---|---|---|---|
| 1,968,436 A | * | 7/1934 | Bishop | 55/487 |
| 5,879,423 A | * | 3/1999 | Luka et al. | 55/482 |
| 5,914,294 A | | 6/1999 | Park et al. | |
| 5,935,282 A | * | 8/1999 | Lin | 55/385.6 |
| 6,383,268 B2 | * | 5/2002 | Oda | 96/134 |
| 6,592,655 B2 | * | 7/2003 | Iriyama et al. | 96/138 |
| 7,655,166 B2 | * | 2/2010 | Zulauf et al. | 264/241 |
| 2005/0223894 A1 | | 10/2005 | Sohnemann | |
| 2006/0272508 A1 | * | 12/2006 | Hoke et al. | 96/134 |
| 2007/0107701 A1 | * | 5/2007 | Buelow et al. | 123/519 |
| 2007/0119306 A1 | * | 5/2007 | Yamada et al. | 96/131 |
| 2008/0257160 A1 | * | 10/2008 | Yoshida et al. | 96/139 |
| 2011/0023719 A1 | * | 2/2011 | Kidman et al. | 96/136 |
| 2011/0072974 A1 | * | 3/2011 | Patel | 96/147 |

* cited by examiner

*Primary Examiner* — Frank Lawrence, Jr.
(74) *Attorney, Agent, or Firm* — James Hasselbeck

(57) ABSTRACT

A hydrocarbon adsorption trap for adsorption of hydrocarbon vapors includes a sheet-like hydrocarbon vapor adsorbent member having a hydrocarbon adsorptive media disposed between two or more media retention layers. The sheet-like member is inserted into an air permeable media support body including a first support member having a first set of locking members and a second support member having a second set of cooperatively configured locking members. The locking members are cooperatively aligned and configured to releaseably lock the first and second support members into a facing relationship with the hydrocarbon vapor adsorbent media arranged and retained therebetween. Mounting features are provided for mounting the hydrocarbon adsorption trap within the intake tract.

13 Claims, 2 Drawing Sheets

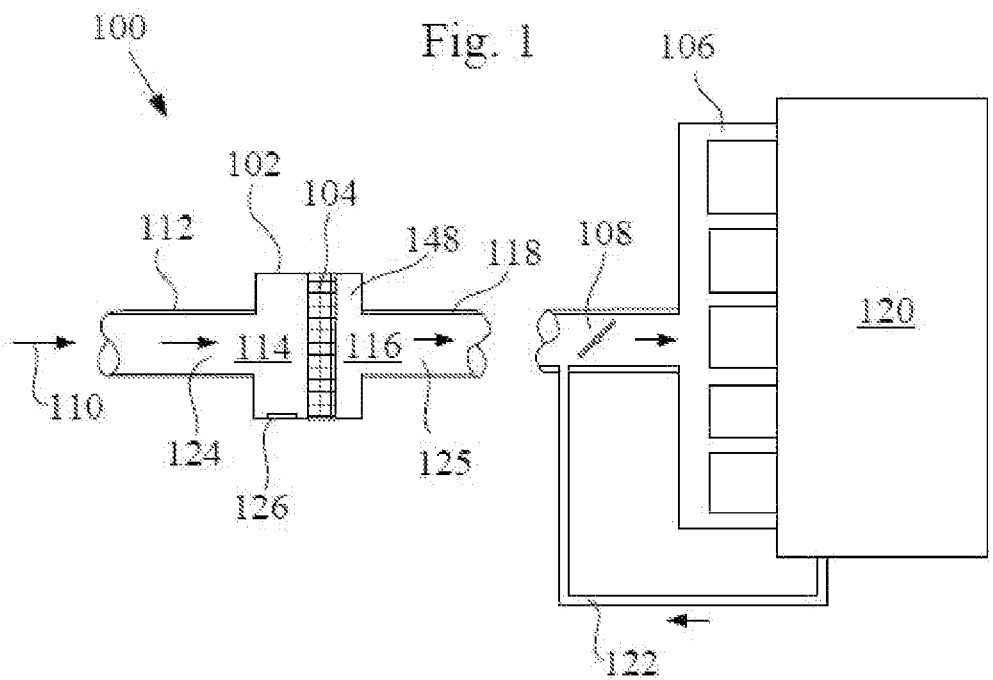
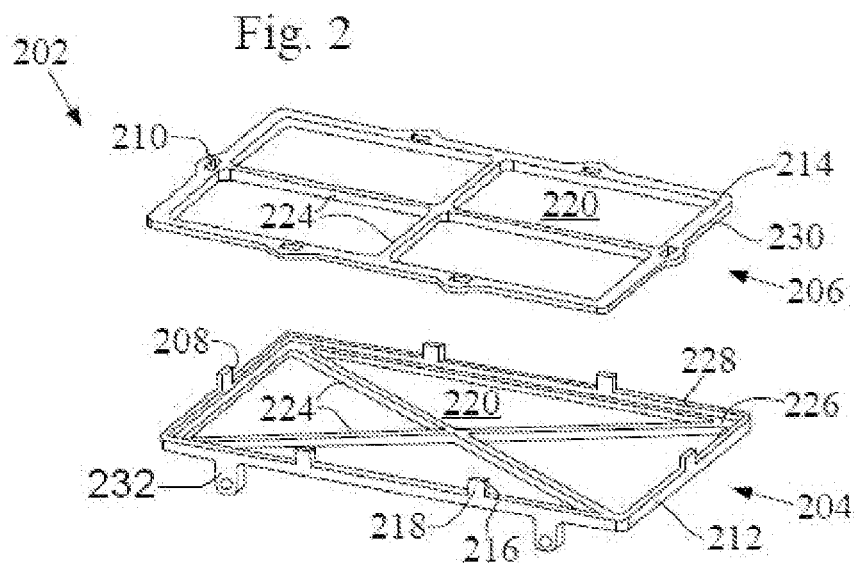

HYDROCARBON ADSORPTION TRAP WITH SNAP CLOSURE FEATURES

TECHNICAL FIELD

The invention relates to internal combustion engines and to air intake systems, to pollution control devices for such systems and, more particularly, to devices for trapping hydrocarbon vapors such as fuel and oil vapors from the air intake system when the engine is shut down and then releasing the trapped vapor back into the air intake system when the engine is later restarted.

BACKGROUND OF THE INVENTION

It is desirable to trap evaporated fuel and oil vapors within the air intake system, thereby preventing their release into the outside environment. Hydrocarbon emissions from motor vehicles are known to be a significant contributing component in urban smog.

Gasoline, for example, is a highly volatile hydrocarbon fuel that includes components known to transition easily from a liquid to vapor phase. Elevated temperatures such as occurring during normal internal combustion engine operation accelerate this liquid to vapor transition. The hydrocarbon vapors, unless treated or captured, may ultimately discharge into the atmosphere. It is also known that hydrocarbon vapors are discharged from the engine crankcase during engine operation. When the engine is shutdown, these vapors may continue to be released from the hot engine crankcase and other components, particularly as the engine cools.

The control of hydrocarbon vapors escaping into the environment is regulated by state and federal regulations. Hydrocarbon traps for capturing hydrocarbon vapors are known. For example, motor vehicles are commonly equipped with hydrocarbon adsorptive emissions canisters connected to the fuel tank for trapping hydrocarbon vapors, particularly as emitted during refueling.

It is known that certain porous materials such as activated carbon are particularly useful for adsorption and removal of organic hydrocarbon vapors. It is known hydrocarbon vapors are liquefied within small micro pores of the activated carbon and may be retained therein by adsorption.

Varieties of flow-through types of hydrocarbon traps are known. As airflow must pass through restrictions in such flow-through traps, these traps present an undesired restriction to the airflow, resulting in an undesirable airflow pressure drop into the air intake tract.

U.S. Pat. No. 5,914,294 discloses a monolithic trap configured to adsorb chemical constituents from a gas stream. This is achieved by bringing the gas into direct contact with the activated carbon in the monolith. One disadvantage of this type of extruded or press formed hydrocarbon trap is that the extrusion and binding process results in a relatively brittle trap that may crack or have individual pieces splinter off.

Another example is U.S. Published Application 2005/0223894, which discloses an adsorption element for adsorbing gases and vapors from the intake tract of an engine. The adsorption element has free-flow channels in an element having a spacer layer and an adsorption layer. One disadvantage of this type of corrugated trap is that the trap itself introduces an unnecessary and undesirable restriction to airflow in the intake tract.

U.S. Patent publication 2011/0023719 discloses a hydrocarbon adsorption trap configured for installation into an air intake tract.

U.S. Patent publication 2011/0072974 discloses a flame retardant hydrocarbon adsorption trap.

As can be understood from the above, there remains a need in the art for a simple, low-cost hydrocarbon adsorption trap that is easy to assemble, rugged, and does not present a restriction to air flow in the air intake tract.

SUMMARY OF THE INVENTION

In at least one aspect of the invention, a hydrocarbon adsorption trap for adsorption of hydrocarbon vapors within an air intake tract of an internal combustion engine includes a sheet-like hydrocarbon vapor adsorbent member having media retention layers arranged in a spaced proximate facing relationship. The media retention layers are formed by one or more media retention sheets (i.e. single sheet may be folded to form two or more layers). A hydrocarbon vapor adsorbent media is arranged in proximity to a major portion of a media-facing surface of the media retention layers. The media retention layers are hydrocarbon vapor permeable and configured to supportively retain the hydrocarbon vapor adsorbent media. Also included is an air permeable media support body having a first support member having a first set of locking members, the first support member having a first receiving area sized and adapted to supportively receive a first face of the hydrocarbon vapor adsorbent member thereon. A second support member having a second set of locking members, the second support member having a second media receiving area sized and adapted to supportively receive an opposing second face of the hydrocarbon vapor adsorbent member thereon. The first and second locking members are cooperatively aligned and configured to releaseably lock the first and second support members into a facing relationship with the hydrocarbon vapor adsorbent media arranged and retained therebetween. The media support body includes at least one mounting feature configured and adapted for mounting the hydrocarbon adsorption trap within the intake tract.

In another aspect of the invention, the hydrocarbon adsorption trap includes a peripheral outer frame portion defining an air permeable region within boundaries of the outer frame portion. At least one rib is provided having at least one end secured to the outer peripheral frame portion and are arranged to extend inwardly into the air permeable region. The ribs are configured and positioned to support and retain the sheet-like hydrocarbon vapor adsorbent member within the air permeable media support body.

In another aspect of the invention, the ribs of the support member form a grate bounded by and secured to the peripheral outer frame portion.

In another aspect of the invention, a portion of the locking members have one-way catch tabs; and another portion of the locking members have engageable retention slots. Each of the one-way catch tabs are aligned and positioned to releaseably engage into an associated one of the retention slots;

In another aspect of the invention, the support members are molded from a plastic material.

In another aspect of the invention, the first support member is hingeably coupled to the second support member, the hinge operable to pivotally open the support members to permit installation or removal of the hydrocarbon vapor adsorbent member therebetween.

In another aspect of the invention, the locking members are operable to snapably secure together the hydrocarbon adsorption trap by hand alone without required tools, welding, screws, fasteners or adhesives.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1 is a schematic diagram of an air intake tract for an internal combustion engine equipped with a hydrocarbon trap, consistent with the present invention;

FIG. 2 depicts an exemplary embodiment of a picture frame-like hydrocarbon adsorption (HCA) media support body of a hydrocarbon adsorption trap, consistent with the present invention;

Figure 3A:
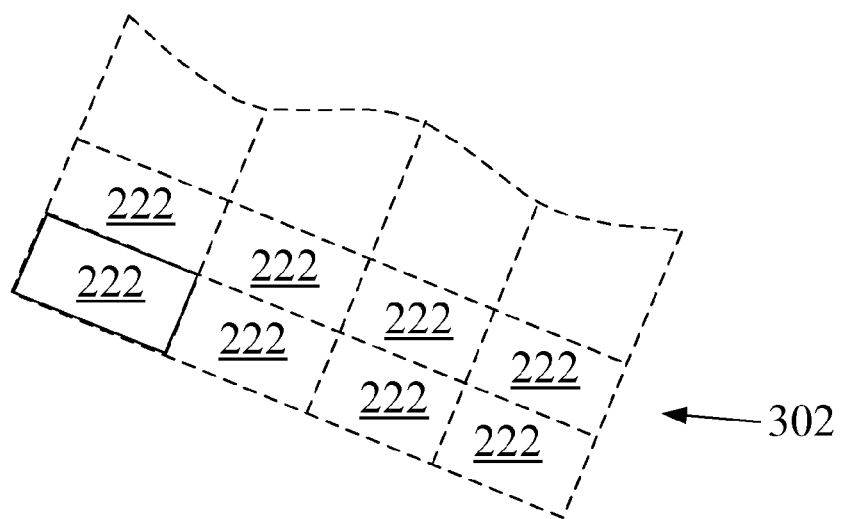
FIG. 3A illustrates cutting of an extended sheet of hydrocarbon adsorption media into individual hydrocarbon adsorption media members configured for use in the HCA media support body of FIG. 2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to an easy to produce, functional and low cost hydrocarbon adsorption trap for an engine air intake tract as disclosed herein. Accordingly, the apparatus components may have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Regulatory requirements from the California Air Resources Board (also known as CARB) together with regulatory rules issued by the Environmental Protection Agency (EPA) establish US requirements for vehicle manufacturers to reduce motor vehicle hydrocarbon emissions. The inventive disclosures herein are useful in meeting this goal by reducing hydrocarbon emissions from the air intake tract of internal combustion engines, particularly gasoline fueled engines.

FIG. 1 is a schematic diagram of an air intake tract for an internal combustion engine equipped with a hydrocarbon trap, consistent with the present invention. The air cleaner 102 housing defines a chamber 148 therein. An air filter element 104 is received into the chamber 148 and divides the chamber 148 into a dirty side 114 and a clean side 116. A vacuum induced by the operation of the internal combustion engine 120 acts to draw outside air stream into the intake tract 100 through intake tract portion 112. The air stream enters the inlet port 124 of the air cleaner 102 to be received at the dirty side 114 of the air cleaner. The air stream flows through the filter element 104 to the clean side 116 of the air cleaner 102. The filter element 104 is adapted and configured to block the passage of contaminants, particularly particulates that may be present in the outside air stream. The now relatively clean intake air stream exits the outlet port 125 to be drawn along intake tract portion 118, perhaps passing through throttle body 108 (if present) and then entering the intake manifold 106 of internal combustion engine 120. FIG. 1 also depicts an optional crankcase vent line 122. For environmental reasons and to meet regulatory requirements, oil and fuel vapors from the crankcase of engine 120 may be vented back into the intake tract 100 such as through crankcase vent line 122, or other similar means, so as to be burned in the combustion cycle of the engine 120, thereby limiting the direct release of fuel and oil vapors (hydrocarbon vapors) into the environment.

When the internal combustion engine 120 shuts down after operation, volatilized hydrocarbon vapors may be present in the intake tract 100 and may continue venting from the crankcase through vent line 122, however these hydrocarbon vapors are no longer drawn into the intake manifold 106 to be burned, therefore hydrocarbon vapors may instead find their way along the intake tract portion 118 to eventually reach the air cleaner 102 and potentially discharge into the outside environment.

According to the present invention, a hydrocarbon adsorptive trap 126 (also known as an HCA trap) is provided, positioned within and secured to an interior portion of the air cleaner 102 at either the clean side 116 or the dirty side 114. When the engine 120 is shutdown, hydrocarbon vapors may flow backwards through the air intake tract 100 to eventually reach the air cleaner 102. HCA trap 126 is operative to adsorb hydrocarbon vapors before they can reach the outside environment. The HCA trap 126 comprises an adsorptive media such as activated carbon, zeolite, or other hydrocarbon vapor adsorptive materials disposed between vapor permeable media support layers. Activated carbon is a preferred hydrocarbon adsorptive media as it is inexpensive, environmentally friendly and readily available.

As the HCA trap is operative to trap hydrocarbon vapors when the engine is shutdown and then later release these trapped vapors when the engine restarts, the HCA trap 126 has a relatively long life and may need to be replaced only infrequently. In embodiments presented herein, it is preferred that the HCA trap 126 be permanently secured within the air cleaner 102 and positioned in the vicinity of but not obstructing the intake air flow through the air cleaner 102. Preferably the HCA trap 126 is permanently secured to an interior wall of the clean air side of the air cleaner 102, although the trap may instead be secured at any suitable location along the intake tract 100. By securing the HCA trap 126 to an interior wall of the air cleaner 102 or air intake tract 100, intake airflow may tangentially contact but is not required to flow through the media of the HCA trap 126. This is advantageous as the HCA trap 126 positioned to the side of the air stream will not introduce an obstruction or restriction to air flow in the air intake tract 100.

As discussed above, when the engine 120 shuts down, hydrocarbon vapors within the air intake tract portion 118, such as present in the intake manifold 106 or rising from the crankcase through vent line 122, may migrate backwards up the air intake tract portion 118 towards the air cleaner 102. The movement or flow rate of these hydrocarbon vapors is quite slow, permitting the HCA trap 126 to be positioned off to the side of the airflow and to be exposed only tangentially to the migrating hydrocarbon vapor. The HCA trap 126 so positioned is operative to absorb these back flow hydrocarbon vapors due to the minimal flow rate and therefore the relatively long exposure time of the hydrocarbon vapors to the HCA trap 126.

When the engine 120 later restarts, then outside air entering the air cleaner 102 is brought into contact with the HCA trap 126 and causes the trapped hydrocarbon vapors to be released from the HCA trap 126 back into the intake tract 100 where they are available to be burned with the intake air stream delivered to the engine 120.

In various aspects of the invention, the hydrocarbon adsorption trap (HCA trap) 126 includes an air permeable support body having a receptacle therein configured to receive a sheet-like hydrocarbon adsorption member. The support body includes one or more mounting feature configured to enable supportive mounting of the HCA trap within the air intake tract.

An objective of the present invention is to provide a low cost, easy to manufacture, easy to assemble HCA trap using a low cost sheet media. FIG. 2 depicts one particular exemplary embodiment of an air permeable hydrocarbon adsorption (HCA) media support body 202 of such a hydrocarbon adsorption trap 126. In the illustrated embodiment, the support body 202 is substantially planer and rectangular, having a picture frame like shape. It is to be understood however that the HCA support bodies of the present inventive disclosure are not limited to planar rectangular embodiments, but may instead be any shape and configuration suitable for supportively receiving a sheet-like hydrocarbon adsorption member therein. Examples of other envisioned HCA support bodies include (for example) media support bodies having a curved (examples: radiused or elliptical) rather than a planer form. These forms are particularly advantageous in adapting the air permeable media support body 202 to closely conform to the shape of an inside wall of an intake track duct to which the media support body will be secured. Also, as an alternative to being substantially rectangular in shape, it is envisioned that the media support body 202 may alternately be realized in an circular, elliptical, or trapezoidal shape (for examples). Often the geometry of the interior of the air intake tract where the HCA trap is to mount will dictate the ultimate shape or form of the HCA trap. Preferably, the media support body 202 is configured and adapted to mount in close proximity to the interior sidewall of the air filter housing, or air intake duct as well as to mount tangentially to the direction of airflow rather than obstructing the free flow of air in the intake tract 100.

Preferably at least one of the support members 204,206 includes one or more mounting tabs 232 configured and positioned for use in supportively mounting the air permeable media support body 202 within an air intake tract, preferably within the clean side of an air filter housing. Preferably the mounting method is by heat staking as this can be accomplished very quickly in a production environment. Alternately screws or a suitable adhesive or any other suitable mounting means may be used as would be known to those skilled in the art.

The media support body 202 is preferably injection molded from a plastic resin material. The support body 202 includes a first support member 204 and a complimentarily designed and mateable second support member 206. The first support member 204 includes a first set of locking members 208. A second set of locking members 210 are provided on the second support member 206 and configured and aligned in complimentary ways to enable lockable engagement of the first support member 204 into a proximate facing relationship with the second support member 206. In some embodiments, the locking members 206,208 are configured to releaseably lock, thereby allowing for easy reopening of the media support body 202 to permit replacement of the HCA media therein.

FIG. 2 depicts a particularly advantageous exemplary embodiment of locking members 208,210. In FIG. 2 the peripheral outer frame portion 212 of the first support member 204 is provided with a first set of locking members 208 configured as one-way catch tabs projecting outwardly to engage with a second set of locking members 210 configured as slots in the peripheral outer frame portion 214 of the second support member 206. The one-way catch tabs include a ramped one-way catch member 216 formed onto or secured onto a portion of the one-way catch tab. The ramped face of the one-way catch member is positioned to elastically deflect the one-way catch tab as it engages into the complimentary aligned slot in the second support member. The one-way catch tab includes a catch face 218 configured to engage onto the outside surface of the second support member 206 when the catch face 218 clears the slot, permitting the one-way catch tab to elastically return substantially towards it original undeflected position. The locking members 208,210 of this embodiment are advantageously releaseably lockable, permitting the first 204 and second 206 support members to be decoupled to permit the sheet-like hydrocarbon adsorption member 222 to be replaced.

As shown in FIG. 2, at least one air permeable region 220 (or opening) is provided in at least one of the support members 204,206 and preferably in both support members. To provide support to the sheet-like hydrocarbon adsorption member 222, at least one rib 224 is positioned to extend inwardly into the air permeable region(s) 220 to provide support to the sheet-like hydrocarbon adsorption member 222 and to assure the sheet-like member is supportively retained in the air permeable media support body 202. The ribs 224 are secured at least at one end (and preferably at both ends) to the peripheral outer frame portion 212,214 of its support member 204,206.

Also in FIG. 2, the ribs 224 of the first support member 204 extend across the air permeable region 220 to join to opposing corners of the peripheral outer frame portion 212 in a diagonal fashion. This is an advantageous rib configuration as the ribs thus positioned form triangular trusses providing significant structural support to the first support member 204, resisting flexure distortion of the rectangular shape of the first support member 204, thereby permitting a reduction in the amount of material used to mold the first support member.

In an alternate aspect of the invention, the first 204 and second 206 support members may be hingeably coupled along proximately aligned mating edges of the outer frame portions 204,206. The hinge configuration is advantageously operable to maintain the first 204 and second 206 support members attached together as a unit and properly aligned for closure.

As can be understood from FIG. 2, the peripheral outer frame portion 212 of the first support member 204 includes a lip 228 and flange 226 defining a first media receiving area on the first support member 204. The peripheral outer frame portion 215 of the second support member 206 has an outside edge 230 configured to be received interior to the lip 228 such that the second support member 206 is held in alignment with the first support member 204 by the lip. The second support member 206 also has a second media receiving area defined as matching the first media receiving area, and is the area into which the sheet like hydrocarbon adsorption member 222 is received between the support members 204,206.

Advantageously, the air permeable media support body 202 with the ramped one-way catch members and complimentary slots, as explained above, is configured to be easily assembled with the sheet-like hydrocarbon adsorption member inserted therein by use of the hands alone without requiring the use of tools, adhesives or welding methods. This is an aid to low cost and efficient manufacture.

FIG. 3A illustrates an extended sheet of hydrocarbon adsorption media, such as from a continuous roll (for example) and the intended way the sheet may be cut into individual sheet-like hydrocarbon adsorption members 222 for insertion into the air permeable media support body 202. The use of continuous media sheets cut into simple sheet-like hydrocarbon adsorption members, together with the use of a simple to close and low cost to manufacture media support body provides a simple HCA adsorption traps with an advantageously low overall cost. Also, the use of intelligently chosen rectangular, triangular or trapezoidal sheet-like hydrocarbon adsorption shapes permits complete usage of the continuous media sheets without waste.

Figure 3B:
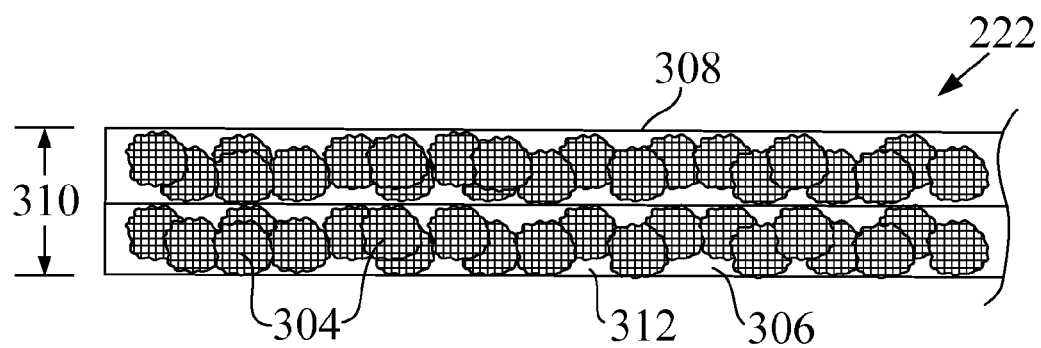
FIG. 3B depicts a section view of an exemplary HCA media, consistent with the present invention.

FIG. 3B depicts a sectional view of an exemplary sheet-like hydrocarbon adsorption member 222.

A hydrocarbon vapor adsorptive media 304 is disposed and contained between a first 306 and a second 308 media retention layers. The hydrocarbon vapor adsorptive media 304 is disposed (preferably evenly distributed) in the gap 310 between the layers 306 and 308 and configured for absorbing hydrocarbon vapors from the intake tract 100, particularly when the engine 120 is not operating. To this end, the media retention layers 306,308 are hydrocarbon vapor permeable. The media retention layers 306,308 may be realized as woven or non-woven synthetic fiber layers, for example polyester fiber layers. In some embodiments media retention layers 306,308 may be realized as synthetic fiber sheets.

In some aspects of the invention, the media retention layers 306,308 may be closeably secured together along their circumferential edges by use of materials such as non-woven polyester fleece, molded polyurethane, plastisol, a suitable variety of adhesive, a sewing process or by friction or heat welding.

In a preferred aspect of the invention, the hydrocarbon vapor adsorptive media 304 comprises activated charcoal vapor adsorptive granules. Activated charcoal has been found to be a suitable hydrocarbon vapor absorbing material due to its very large surface area to weight ratio together with its porous internal structure while also being readily available, environmentally friendly and relatively low in cost.

In other aspects of the invention the hydrocarbon vapor adsorptive media may comprise zeolite or alternately other absorbent materials having a structure of micro pores of suitable size to liquefy, absorb and thereby trap hydrocarbon vapors.

In some aspects of the invention the hydrocarbon vapor adsorptive media 304, for example activated carbon granules, are at least weakly bonded together by the addition of a small amount of adhesive 312 operable to cohesively bond the activated carbon into a preferred sheet-like shape and retentively secure the hydrocarbon vapor adsorptive media 304 to the media retention layers 306,308. Preferably the adhesive bonding agent is configured to stabilize the form of the vapor adsorptive media 304 so as to maintain a preferred relatively uniform distribution of the granules throughout the gap 310. This is advantageous not only to maintain the preferred thin sheet-like shape of the sheet-like hydrocarbon adsorptive member 222, but also to maximize the exposed available surface area of the hydrocarbon vapor adsorptive media 304 over the media retention layer surface, thereby optimizing removal of hydrocarbon vapors by maximizing available hydrocarbon adsorptive surface area.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

The invention claimed is:

1. A hydrocarbon adsorption trap for adsorption of hydrocarbon vapors within an air intake tract, comprising:
  a hydrocarbon vapor adsorbent member including:
    two or more media retention layers, wherein media retention layers are arranged in a spaced proximate facing relationship, wherein said media retention layers are formed by one or more media retention sheets; and
    wherein adjacent pairs of said proximately arranged facing layers form at least one gap therebetween;
    a granular hydrocarbon vapor adsorbent media arranged in said gap, wherein said media retention layers close about said gap to supportively retain said granular hydrocarbon vapor adsorbent media therein;
    wherein said granular hydrocarbon vapor adsorbent media is arranged in proximity to a major portion of a media facing surface of said media retention layers, said media retention layers configured to supportively retain said granular hydrocarbon vapor adsorbent media positionally proximate to said media facing surface;
    wherein said hydrocarbon adsorbent media is adhesively secured to at least one of said media retention layers;

an air permeable media support body including:
  a first support member including a first media receiving area sized and adapted to supportively receive a first face of said hydrocarbon vapor adsorbent member, said first support member overlaying and extending across said first face; and
  a second support member including a second media receiving area sized and adapted to supportively receive an opposing second face of said hydrocarbon vapor adsorbent member, said second support member overlaying and extending across said second face;
  wherein said first and second support members are configured and adapted to supportively retain said hydrocarbon vapor adsorbent media therebetween.

2. The hydrocarbon adsorption trap of claim 1, wherein said hydrocarbon vapor adsorbent member is a sheet-like member.

3. The hydrocarbon adsorption trap of claim 1, wherein said air permeable media support body further comprises:
  a first set of locking members arranged on said first support member; and
  a second set of locking members arranged on said second support member;
  wherein first and second locking members are cooperatively aligned and configured to releaseably lock said first and second support members into a facing relationship with said hydrocarbon vapor adsorbent media arranged and retained therebetween.

4. The hydrocarbon adsorption trap of claim 1, wherein at least one of said support members comprises:
  a peripheral outer frame portion circumferentially surrounding outer edges of said media retention layers, said peripheral outer frame portion defining an air permeable region within boundaries of said outer frame portion;
  at least one rib having at least one end secured to said outer peripheral frame portion and arranged to extend inwardly into said air permeable region; and
  wherein said at least one rib is configured and positioned to support and retain said sheet-like hydrocarbon vapor adsorbent member within said air permeable media support body.

5. The hydrocarbon adsorption trap of claim 4, wherein said at least one rib is a plurality of ribs;
  wherein said ribs of said support member form a grate bounded by and secured to said peripheral outer frame portion.

6. The hydrocarbon adsorption trap of claim 3, wherein a portion of said locking members comprise one-way catch tabs; and
  another portion of said locking members comprise engageable retention slots;
  wherein each of said one-way catch tabs are aligned and positioned to releaseably engage into an associated one of said retention slots.

7. The hydrocarbon adsorption trap of claim 1, wherein said support members are molded from a plastic material.

8. The hydrocarbon adsorption trap of claim 3, wherein said first support member is hingeably coupled to said second support member,
  said hingable coupling operable to enable pivotal opening of said support members to permit installation or removal of said hydrocarbon vapor adsorbent member between said support members.

9. The hydrocarbon adsorption trap of claim 3, wherein said locking members are operable to snapably secure together said hydrocarbon adsorption trap by hand alone.

10. A hydrocarbon adsorption trap for adsorption of hydrocarbon vapors within an air intake tract, comprising:
  a sheet-like hydrocarbon vapor adsorbent member including:
    at least two media retention layers arranged in a spaced proximate facing relationship, wherein said media retention layers are formed by one or more media retention sheets, wherein adjacent pairs of said proximately arranged facing layers form at least one gap therebetween;
    a granular hydrocarbon vapor adsorbent media arranged in said gap, wherein said media retention layers close about said gap to supportively retain said hydrocarbon vapor adsorbent media therein;
  wherein said hydrocarbon adsorbent media is adhesively secured to at least one of said media retention layers;
  an air permeable media support body including:
    a first support member having a first set of locking members, said first support member having a first media receiving area sized and adapted to supportively receive a first face of said hydrocarbon vapor adsorbent member thereon;
    a second support member having a second set of locking members, said second support member having a second media receiving area sized and adapted to supportively receive an opposing second face of said hydrocarbon vapor adsorbent member thereon;
    wherein first and second locking members are cooperatively aligned and configured to releasably lock said first and second support members into a facing relationship with said hydrocarbon vapor adsorbent media arranged and retained therebetween;
    wherein said media support body includes at least one mounting feature configured and adapted for mounting said hydrocarbon adsorption trap within said intake tract;
    wherein said support members are molded from a plastic material.

11. The hydrocarbon adsorption trap of claim 10, wherein at least one of said support members comprises:
  a peripheral outer frame portion circumferentially surrounding outer edges of said media retention layers, said peripheral outer frame portion defining an air permeable region within boundaries of said outer frame portion;
  at least one rib having at least one end secured to said outer peripheral frame portion and arranged to extend inwardly into said air permeable region; and
  wherein said at least one rib is configured and positioned to support and retain said sheet-like hydrocarbon vapor adsorbent member within said air permeable media support body.

12. The hydrocarbon adsorption trap of claim 11, wherein a portion of said locking members comprise one-way catch tabs; and
  another portion of said locking members comprise engageable retention slots;
  wherein each of said one-way catch tabs are aligned and positioned to releaseably engage into an associated one of said retention slots.

13. The hydrocarbon adsorption trap of claim 11, wherein said first support member is hingeably coupled to said second support member,
  said hingable coupling operable to enable pivotal opening of said support members to permit installation or removal of said hydrocarbon vapor adsorbent member between said support members.

* * * * *